United States Patent [19]
Broadhead et al.

[11] Patent Number: 5,888,049
[45] Date of Patent: Mar. 30, 1999

[54] GAS TURBINE ENGINE ROTOR DISC WITH COOLING FLUID PASSAGE

[75] Inventors: Peter Broadhead; John Hoptroff; Peter Avery, all of Derby, England

[73] Assignee: Rolls-Royce plc, London, England

[21] Appl. No.: 871,764

[22] Filed: Jun. 9, 1997

[30] Foreign Application Priority Data

Jul. 23, 1996 [GB] United Kingdom ............... 9615394

[51] Int. Cl.⁶ .................................. F01D 5/08
[52] U.S. Cl. ................... 416/96 R; 415/115; 415/116; 416/219 R; 416/95
[58] Field of Search .................... 416/96 R, 97 R, 416/95, 96 A, 219 R, 220 R; 415/115, 116

[56] References Cited

U.S. PATENT DOCUMENTS

| | | | |
|---|---|---|---|
| 3,014,269 | 12/1961 | Graham et al. | |
| 3,918,835 | 11/1975 | Yamarik et al. | 416/97 R |
| 4,344,738 | 8/1982 | Kelly et al. | 416/95 |
| 4,626,169 | 12/1986 | Hsing et al. | 416/96 R |
| 4,923,371 | 5/1990 | Ben-Amoz | 416/96 R |
| 5,700,130 | 12/1997 | Barbot et al. | 416/96 R |

FOREIGN PATENT DOCUMENTS

| | | | |
|---|---|---|---|
| 2552817 | 5/1985 | France . | |
| 2635577 | 2/1990 | France . | |
| 909059 | 4/1954 | Germany | 416/96 R |
| 2065788 | 7/1981 | United Kingdom . | |
| 2 211 775 | 7/1989 | United Kingdom . | |

Primary Examiner—Thomas E. Denion
Assistant Examiner—Richard Woo
Attorney, Agent, or Firm—W. Warren Taltavull; Farkas & Manelli PLLC

[57] ABSTRACT

A gas turbine engine rotor disc (20) is provided with a plurality of cooling air supply passages (32) which are generally radially extending but are inclined in the downstream direction. Each passage (32) has a cross-sectional configuration which renders the ends (34) of the passages (32) less likely than normal to act as the site of hoop-stress induced cracks.

10 Claims, 3 Drawing Sheets

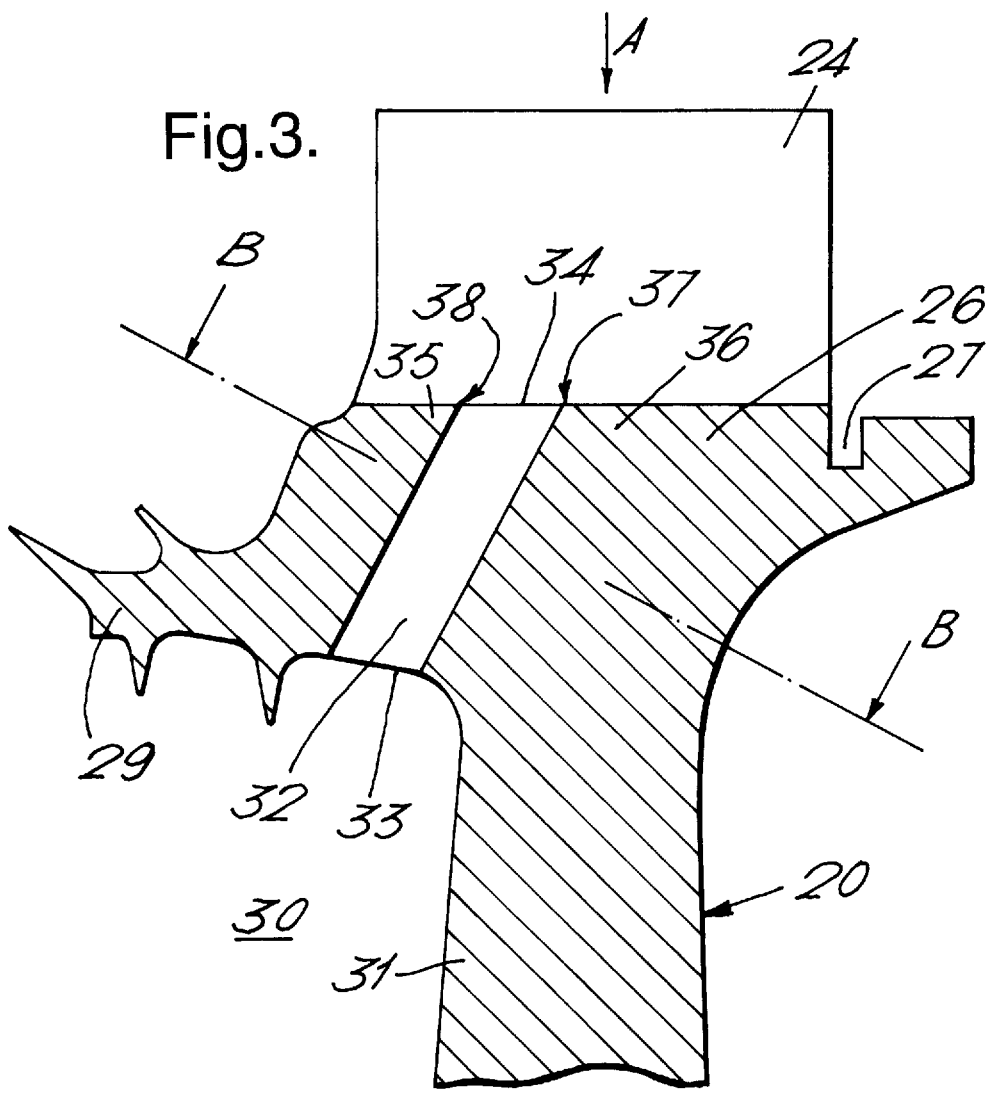
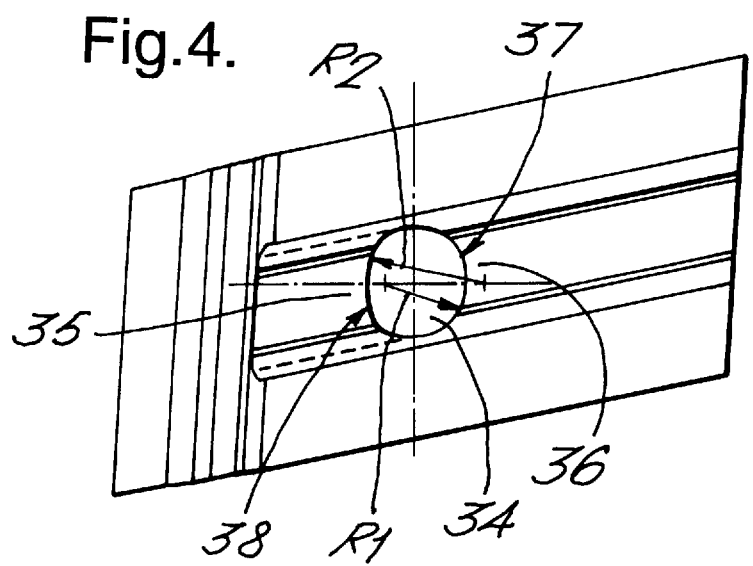

GAS TURBINE ENGINE ROTOR DISC WITH COOLING FLUID PASSAGE

THE FIELD OF THE INVENTION

This invention relates to a gas turbine engine rotor disc having at least one cooling fluid passage extending therethrough in a generally radial direction with respect to the axis of rotation of the rotor disc.

BACKGROUND OF THE INVENTION

Gas turbine engines typically include several rotor discs which carry a plurality of radially extending aerofoil blades on their periphery. Those aerofoil blades can be in the form of compressor blades or turbine blades. In the case of rotor discs carrying turbine blades, particularly turbine blades for use in the hotter, higher pressure portions of the engine's turbine, it is usually necessary to provide at least some of those turbine blades with internal cooling. Typically, that cooling is provided by cool air tapped from the engine's compressor and directed into passages within the blade interiors. The air is thus placed in intimate heat exchange relationship with the blades, so bringing about a reduction in their operating temperature, before being exhausted into the general hot gas flow through the turbine.

Cooling air is often supplied to the turbine blades through supply passages provided in the rotor disc carrying the turbine blades. Typically, cool air extracted from the compressor is directed along a path close to the engine's longitudinal axis before flowing in radially outward directions and into the disc supply passages. The disc supply passages are generally radially extending so as to direct the cooling air to the radially inward portions of the blades where they communicate with entrances to the cooling passages within the blades.

In use, gas turbine engine rotor discs rotate at very high speeds and are consequently subject to major hoop stresses. The cooling air supply passages within the disc are, of course, subject to the influence of those hoop stresses. Since the passages extend generally normal to the direction of the hoop stresses, there can be a tendency for portions of the passages to act as sites for the initiation and propagation of cracks within the disc. Such cracks are clearly undesirable in view of the limiting effect that they can have upon the life of the rotor disc.

The cross-sectional configuration of the disc passages can be an important factor in the tendency for such cracking to occur. Typically, the passages are of circular cross-section since this is frequently the cheapest and easiest configuration to produce. Under certain circumstances, depending upon the passage diameter and the anticipated rotational speed of the disc, such passages are acceptable. However, there may be other circumstances in which such circular cross-section passages can give rise to cracking.

In U.S. Pat. No. 4,344,738, the problem of rotor disc cracking is tackled by changing the cross-sectional configuration of each disc passage from circular to elliptical cross-section. The major axis of the ellipse extends in a generally circumferential direction so that under the influence of hoop stresses, there is a reduced tendency for cracks to be initiated.

SUMMARY OF THE INVENTION

It is an object of the present invention to provide a new gas turbine engine rotor disc cooling passage configuration which provides greater resistance to crack initiation and propagation.

According to the present invention, a gas turbine engine rotor disc having an axis of rotation is provided with a plurality of passages therein, each of said passages extending in a direction having a generally radial component with respect to said axis of rotation so that each passage has a radially inner inlet portion and a radially outer outlet portion, each of said passage portions defining a peripheral edge with the region of the external surface of said rotor disc local thereto, at least the radially outer outlet portion of each said passage being inclined with respect to said region of the external surface of said rotor disc local thereto so that axially opposite regions of said radially outer passage outlet portion respectively define acute and obtuse angled corners with said local external surface region, both of said obtuse and acute angled corners in turn defining edges which constitute part of the peripheral edge defined by said radially outer passage outlet portion and said local external surface region, the cross-sectional configuration of said passage being such that the edges defined by both of said obtuse and acute angled corners are curved in the cross-sectional plane of said passage, the edge defined by said obtuse angled corner being more curved than that defined by said acute angled corner.

Preferably, said passage is inclined in an axially downstream direction so that said acute-angled corner is axially upstream of said obtuse-angled corner.

The part of said peripheral edge defined by said radially outer passage outlet portion and said local external surface region interconnecting said edges defined by said obtuse and acute angled corners is preferably predominantly curved in the cross-sectional plane of said supply passage.

Said rotor disc may be provided with generally axially extending slots in its periphery for the reception of the roots of aerofoil blades, in which case, each of said supply passages terminates in one of said slots.

Said disc may be provided with a peripheral rim, each of said supply passages being at least partially located in said rim.

Each of said supply passages may be generally straight.

Said edge defined by said obtuse-angled corner is preferably in the form of an arc of a circle.

Said edge defined by said acute-angled corner is preferably in the form of an arc of a circle.

Said edge defined by said obtuse-angled corner is preferably in the form of an arc of a first circle and said edge defined by said acute-angled corner is in the form of an arc of a second circle, said first arc being of smaller radius than said second arc.

BRIEF DESCRIPTION OF THE DRAWINGS

The present invention will now be described, by way of example, with reference to the accompanying drawings in which:

FIG. 3 is sectioned side view of part of the rotor disc shown in FIG. 2.

FIG. 4 is a view on arrow A of FIG. 3 in which, in the interests of clarity, an aerofoil blade has been removed.

DETAILED DESCRIPTION OF THE INVENTION

Figure 1:
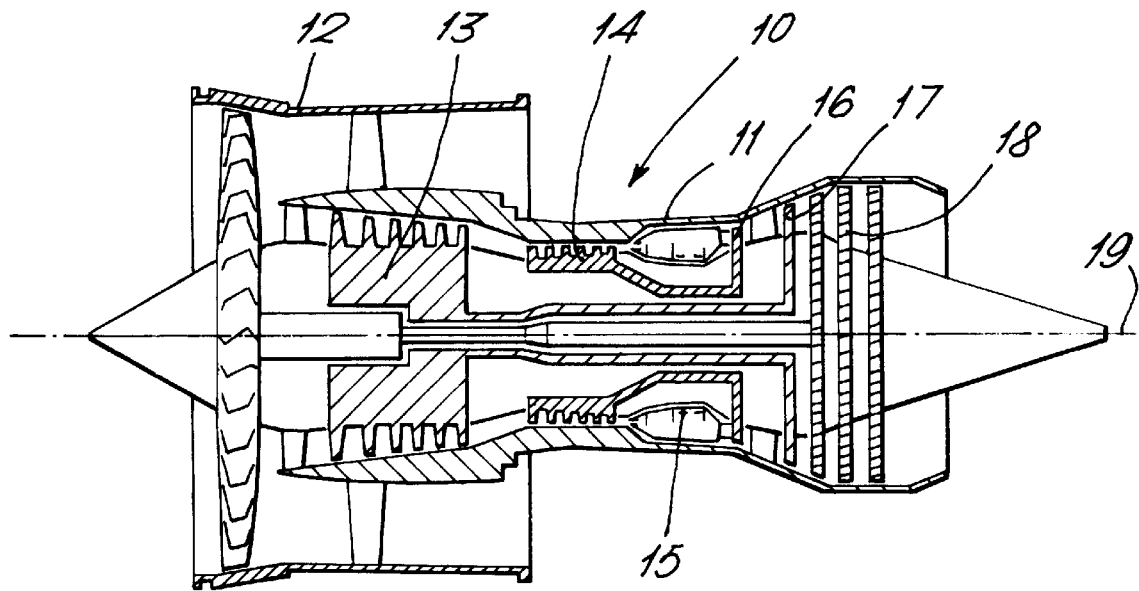
FIG. 1 is a schematic sectioned side view of a ducted fan gas turbine engine having a rotor disc in accordance with the present invention.

With reference to FIG. 1, a ducted fan gas turbine engine generally indicated at 10 is of conventional construction, comprising a core engine 11 which drives a ducted fan 12. The core engine 11 comprises intermediate and high pressure compressors 13 and 14, combustion equipment 15, and high, intermediate and low pressure turbines 16, 17 and 18 respectively.

Air compressed by the fan 12 and compressors 13 and 14 is mixed with fuel and mixture combusted in the combustion equipment 15. The resultant hot combustion products then expand through, and thereby drive, the turbines 16, 17 and 18 before being exhausted from the rear of the core engine 11 to provide propulsive thrust. The turbines 16, 17 and 18 in turn drive the fan 12 and compressors 13 and 14 through concentric shafts provided along the longitudinal axis 19 of the engine 10. Although some of the air acted upon by the fan 12 passes into the core engine 11, the majority by-passes the core engine 11 to provide propulsive thrust.

Figure 2:
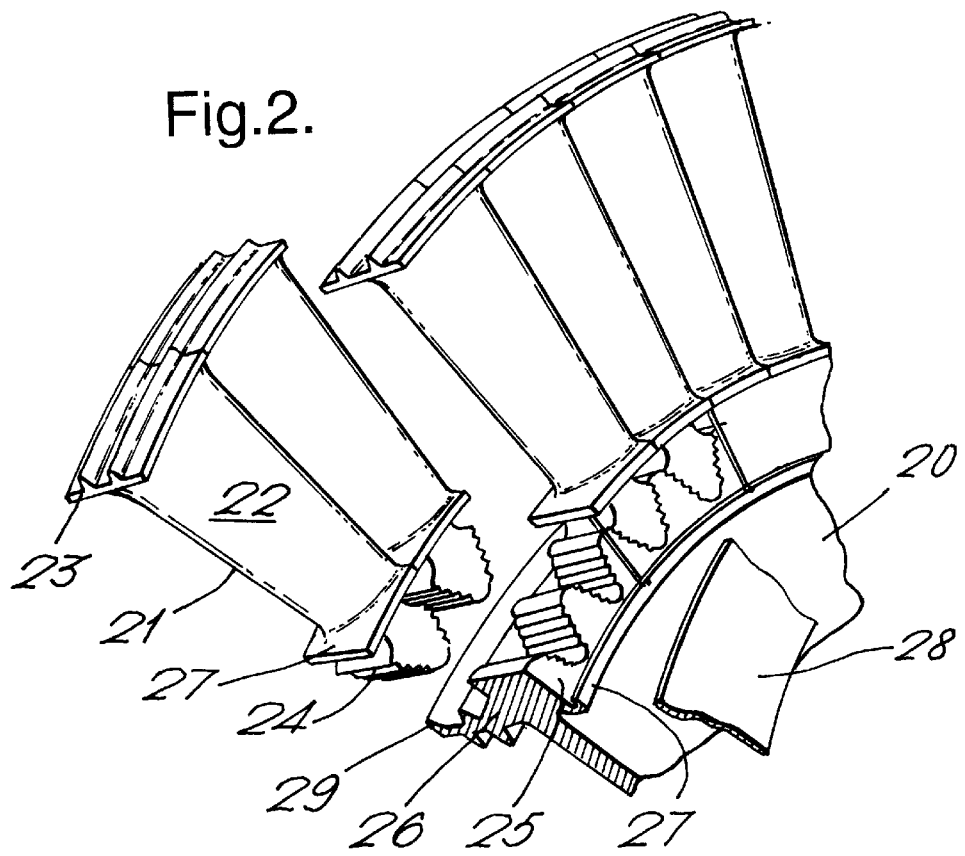
FIG. 2 is a perspective view of part of the high pressure turbine of the ducted fan gas turbine engine shown in FIG. 1 showing part of the rotor disc and aerofoil blades of that turbine.

The high pressure turbine 16 comprises a rotor disc 20, part of which can be seen in FIG. 2, having an annular array of radially extending aerofoil blades 21 mounted on its periphery. Each aerofoil blade 21 comprises an aerofoil portion 22, a shrouded tip portion 23 and a root portion 24. The root portion 24 is of the so-called firtree configuration to enable it to fit in a correspondingly shaped slot 25 provided in the rim 26 of the disc 20 to provide radial blade 21 retention. In this particular case, the slot is axially extending with respect to the engine axis 19. However, the slot 25 could be circumferentially extending if so desired. A platform 27 provided between the root 24 and aerofoil 22 portions carries a radially inwardly directed circumferentially extending slot (not shown) which confronts a similar slot 27 provided in the disc rim 26. These slots accommodate blade retention plates 28 in a known manner to provide axial constraint of the aerofoil blades 21 and limit gas leakage between the firtree root portions 24 and the slots 25 in which they locate.

The disc rim 26 additionally includes an annular sealing element 29 on its upstream portion which cooperates with static engine structure (not shown) to define a conventional labyrinth air seal. Throughout this specification, the terms "upstream" and "downstream" are used in relation to the general gas flow through the engine 10 and so references to those terms used in this specification shall be construed accordingly.

The structure of the radially outer part of the disc 20 and in particular its rim 26 can be seen more clearly if reference is now made to FIG. 3. The disc rim 26 is axially elongated so that its upstream end defines the annular sealing element 29 while the downstream end defines the retention plate slot 27.

The high pressure turbine 16 operates in an extremely hot environment so that some degree of internal cooling of the aerofoil blades 21 is necessary. This is achieved by the well known technique of extracting some of the air compressed by the high pressure compressor 14 and directing it through passages (not shown) provided within the aerofoil blades 21. Conventionally the air passes along the central portion of the engine 10 to be exhausted into the region 30 adjacent the upstream face 31 of the disc 20. The air then flows from the region 30 into aerofoil blade cooling passages (not shown) through supply passages 32 provided in the upstream portion of the disc rim 26. One supply passage 32 is provided for each aerofoil blade 21 and each supply passage 32 directs cooling air to an inlet (not shown) provided in the root portion of its associated aerofoil blade 21.

In order to ensure that each cooling air supply passage 32 provides an effective supply of cooling air to its associated aerofoil blade 21, the radially inner inlet portion 33 of the supply passage 32 is situated in the radially inner, upstream region of the disc rim portion 26. There it has clear access to the pressurised cooling air in the region 30. It is desirable to position the cooling passage inlet portion 33 in the upstream region of the disc rim 26 to avoid the positioning of potentially crack-inducing apertures in the front face 31 of the disc 20.

The radially outer outlet portion 34 of the supply passage 32 is positioned in the base of the firtree root slot 25 as can also be seen in FIG. 4. There it is aligned with a cooling air inlet (not shown) in the firtree root 24 of the aerofoil blade 21, ensuring a flow of air into the cooling system of the blade 21. In order for the cooling air supply passage 32 to interconnect the region 30 and the aerofoil blade 21 in an effective manner, it is necessary for it to be generally radially extending. However, it is also necessary for the cooling air supply passage 32 to be axially inclined in the downstream direction as can be seen in FIG. 3. This is because the conventional place for the aerofoil blade 21 cooling air inlet is close to the axially mid-region of its firtree root 24. This position is, as can be seen from FIG. 3, downstream of the position of supply passage inlet portion 33 in the upstream region of the disc rim 26.

During normal engine operation, the disc 20 rotates at very high speeds, thereby generating high levels of hoop stress within the disc 20 and particularly within the disc rim 26. These hoop stresses can be a particular problem in the region of the radially outer outlet portion 34 of the cooling air supply passage 32. The hoop stresses, by their nature, act in a generally circumferential direction. Consequently, there can be a danger that the stresses could result in the formation of cracks in the disc rim 26 in the region of the cooling supply outlet portion 34. The cracks would be in those regions of the outlet portion 34 which lie axially opposite each other, that is adjacent a plane containing the axis of rotation of the disc 20 i.e. the main engine axis 19.

In certain respects, the inclination of the cooling air supply passage 32 can compound the problem of crack formation in the disc rim 26. This is because the passage 32 is inclined with respect to the local external surface of the disc rim 26 i.e. the base of the firtree slot 25. This inevitably results in the axially opposite corners 35 and 36 of the passage outlet portion 34 respectively defining acute and obtuse angles with the local external surface of the disc rim 26.

The obtuse-angled passage outlet portion corner 36 is, by virtue of its configuration, resistant to the formation of hoop stress-induced cracking. Indeed as the magnitude of the obtuse angle is increased by further inclination of the supply passage 32, the resistance to hoop stress-induced cracking in the region of the corner 36 is increased correspondingly. However, as the angle of the obtuse-angled corner 36 with the local external surface of the disc rim 26 is increased, so the magnitude of the angle of the axially opposite acute-angled passage outlet portion corner 35 with that local surface is correspondingly decreased. This, unfortunately, has a detrimental effect upon the ability of the acute-angled passage outlet portion corner 35 to resist hoop stress-induced cracking.

In order to enhance the ability of the acute-angled passage outlet portion corner 35, and indeed the obtuse-angled passage outlet portion corner 36 to resist hoop stress-induced cracking, the cross-section of the supply passage 32 is particularly configured in accordance with the present invention. That configuration can be seen in FIGS. 4 and 5.

Figure 5:
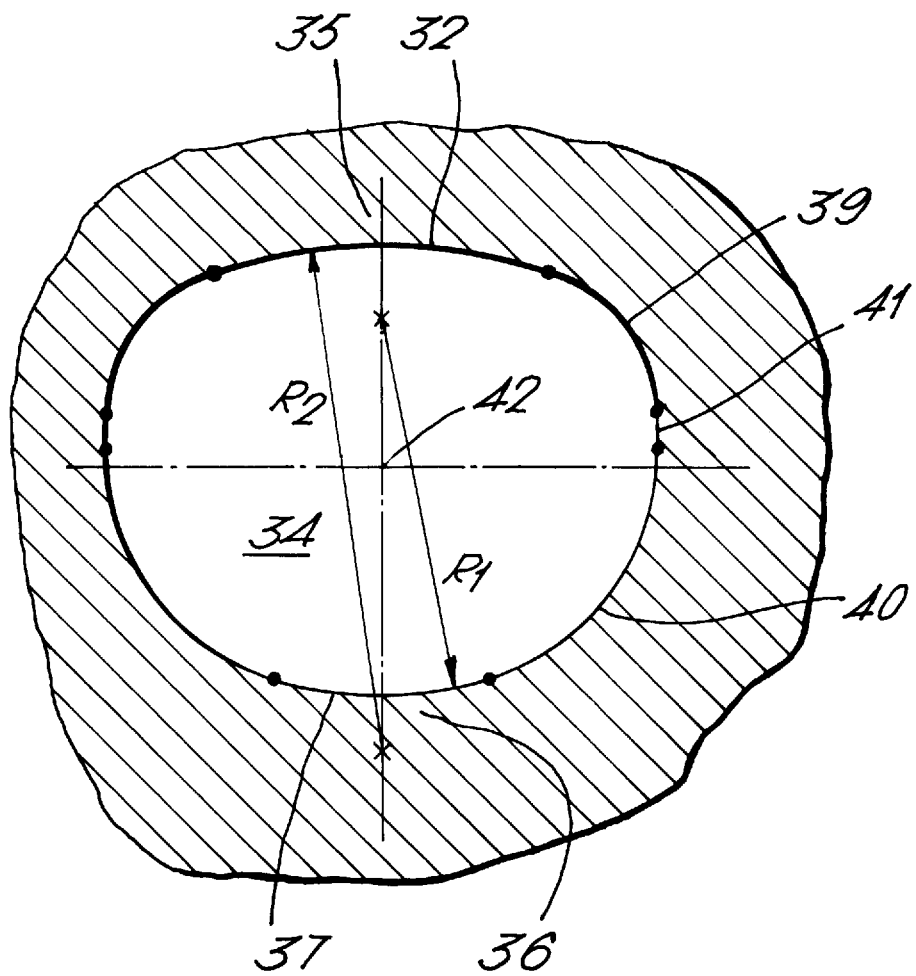
FIG. 5 is part of the view on section line B—B of FIG. 3.

Referring to FIGS. 4 and 5, the obtuse-angled corner 36 defines an arcuate edge 37 in the cross-sectional plane of the supply passage 32 which has a radius of curvature R1 about the longitudinal axis 42 of the supply passage 32. The axially opposite acute-angled corner 35 defines an arcuate edge 38 which has a radius of curvature R2 about the supply passage longitudinal axis 42. R2 is of greater magnitude than R1 so that the edge portion 37 defined by the obtuse-angled corner 36 is more curved than the edge portion 38 defined by the acute angled corner 35. Moreover, both of the radii R1 and R2 are of greater magnitude than would be that of the radius of a supply passage having both a circular cross-sectional configuration and the same cross-sectional area as that of the supply passage 32. Thus those parts of the passage outlet portion 34 that are in danger of cracking through the influence of hoop stresses within the disc rim 26 are provided with resistance to such cracking by virtue of their disposition and shape.

The remaining parts of the peripheral edge of the passage outlet portion 34 that interconnect the edges 37 and 38 in accordance with the present invention are configured in such a manner as to achieve a smooth transition between the edges 37 and 38. This can be seen most clearly in FIG. 5 where the edges 37 and 38 are interconnected by two arcuate edges 39 and 40 having a short straight portion 41 interposed between them. It will be appreciated, however, that the particular configuration of these interconnecting parts 39, 40 and 41 need not necessarily be of this configuration and may vary in accordance with the particular overall requirements of the supply passage 32.

The cross-sectional configuration of the supply passage 32 as shown in FIG. 5 is constant throughout its length. Consequently, the passage inlet portion 33 has the same general shape as the passage outlet portion 34 and so enjoys the same crack resistance properties.

Although in the case of the example described above, the supply passage 32 is straight, it will be appreciated that this is not in fact essential and that under certain circumstances, it may be desirable for it to be curved.

It will be seen that the present invention provides a means for ensuring that rotor disc cooling air supply passages 32 are of sufficient size to comply with the cooling air requirements of aerofoil blades 24 carried by the disc 20 while at the same time minimising the likelihood of the passages initiating stress cracking in the disc. Thus, for example, if it is necessary for the supply passages 32 to be less steeply inclined, the increased likelihood of stress cracking occurring in the region of passage acute-angled corner 35 by virtue of the reduction of that acute angle can be countered by ensuring that the edge 38 of that corner is of reduced curvature. However, the opposite obtuse-angled corner 36 will, by virtue of the reduced inclination of the supply passage 32, be less prone to stress cracking. Consequently, the curvature on the edge 37 defined by that corner 36 may be increased. This provides flexibility in permitting the cross-sectional area of the supply passage 32 to be tailored to the particular cooling air flow requirements of the aerofoil blades 24 carried by the disc 20 while maintaining an enhanced resistance to stress cracking arising from the supply passage 32.

We claim:

1. A gas turbine engine rotor disc having an axis of rotation and a plurality of passages therein, each of said passages extending in a direction having a generally radial component with respect to said axis of rotation so that each passage has a radially inner inlet portion and a radially outer outlet portion, each of said passage portions defining a peripheral edge with the region of the external surface of said rotor disc local thereto, at least the radially outer outlet portion of each said passage being inclined with respect to said region of the external surface of said rotor disc local thereto so that axially opposite regions of said radially outer passage outlet portion respectively define acute and obtuse angled corners with said local external surface region, both of said obtuse and acute angled corners in turn defining edges which constitute part of the peripheral edge defined by said radially outer passage outlet portion and said local external surface region, the cross-sectional configuration of said passage being such that the edges defined by both of said obtuse and acute angled corners are curved in the cross-sectional plane of said passage, the edge defined by said obtuse angled corner being more curved than that defined by said acute angled corner.

2. A gas turbine engine rotor disc as claimed in claim 1 wherein said passage is inclined in an axially downstream direction so that the edge defined by said acute-angled corner is axially upstream of the edge defined by said obtuse-angled corner.

3. A gas turbine engine rotor disc as claimed in claim 1 wherein the part of said peripheral edge defined by said radially outer passage outlet portion and said local external surface region interconnecting said edges defined by said obtuse and acute angled corners is predominantly curved in the cross-sectional plane of said passage.

4. A gas turbine engine rotor disc as claimed in claim 1 wherein said rotor disc is provided with generally axially extending slots in its periphery for the reception of the roots of aerofoil blades, each of said passages terminating in one of said slots.

5. A gas turbine engine rotor disc as claimed in claim 1 wherein said disc is provided with a peripheral rim, each of said passages being at least partially located in said rim.

6. A gas turbine engine rotor disc as claimed in claim 1 wherein each of said supply passages is generally straight.

7. A gas turbine engine rotor as claimed in claim 1 wherein said edge defined by said obtuse-angled corner is in the form of an arc of a circle.

8. A gas turbine engine rotor as claimed in claim 1 wherein said edge defined by said acute-angled corner is in the form of an arc of a circle.

9. A gas turbine engine rotor as claimed in claim 1 wherein said edge defined by said obtuse-angled corner is in the form of an arc of a first circle and said edge defined by said acute-angled corner is in the form of an arc of a second circle, said first arc being of smaller radius than said second arc.

10. A gas turbine engine provided with a rotor as claimed in claim 1.

* * * * *